(12) United States Patent
Kacprzak

(10) Patent No.: US 9,834,174 B2
(45) Date of Patent: Dec. 5, 2017

(54) TENSIONER FOR A VEHICLE SAFETY DEVICE

(71) Applicant: TRW AUTOMOTIVE GMBH, Alfdorf (DE)

(72) Inventor: Michal Kacprzak, Schwäbisch Gmünd (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 15/118,915

(22) PCT Filed: Feb. 11, 2015

(86) PCT No.: PCT/EP2015/000294
§ 371 (c)(1),
(2) Date: Aug. 15, 2016

(87) PCT Pub. No.: WO2015/120980
PCT Pub. Date: Aug. 20, 2015

(65) Prior Publication Data
US 2016/0368451 A1 Dec. 22, 2016

(30) Foreign Application Priority Data
Feb. 17, 2014 (DE) .................. 10 2014 002 006

(51) Int. Cl.
*B60R 22/28* (2006.01)
*B60R 22/46* (2006.01)
*B60R 22/195* (2006.01)

(52) U.S. Cl.
CPC ...... *B60R 22/4619* (2013.01); *B60R 22/1952* (2013.01); *B60R 22/1955* (2013.01); *B60R 22/4633* (2013.01); *B60R 2022/4638* (2013.01)

(58) Field of Classification Search
CPC .................. B60R 22/1952; B60R 22/1955
USPC .................. 280/806; 297/470, 480
See application file for complete search history.

(56) References Cited

U.S. PATENT DOCUMENTS

| | | | | |
|---|---|---|---|---|
| 5,944,350 A | * | 8/1999 | Grabowski | B60R 22/1952 280/806 |
| 6,131,951 A | * | 10/2000 | Chicken | B60R 22/1952 280/806 |
| 6,877,776 B2 | * | 4/2005 | Ukita | B60R 22/1952 280/806 |
| 7,490,857 B2 | * | 2/2009 | Tomita | B60R 22/1952 280/806 |
| 7,618,064 B2 | * | 11/2009 | Kuroki | B60R 22/1955 280/806 |

(Continued)

*Primary Examiner* — Toan To
(74) *Attorney, Agent, or Firm* — Tarolli, Sundheim, Covell & Tummino LLP

(57) ABSTRACT

A tensioner (10) for a vehicle safety device is provided with a tubular casing (12) in which a piston (18) is movably supported as well as with a closure member (26) closing the tubular casing (12) on the front face and forming a cable guide (38) for a tensioning cable (28) which may be connected to a belt buckle or an end fitting (34) and in which cable guide the tensioning cable (28) is deflected in arc shape. Further, the tensioner (10) comprises an inflator (24) accommodated in the closure member (26), wherein the tubular casing (12) includes a receiving area (14) for receiving the closure member (26) as well as a fastening portion (16) serving for fastening the tensioner (10) to a vehicle frame.

20 Claims, 3 Drawing Sheets

(56) References Cited

U.S. PATENT DOCUMENTS

| | | | |
|---|---|---|---|
| 8,814,211 B1* | 8/2014 | Kohlndorfer | B60R 22/1952 |
| | | | 280/806 |
| 2004/0094946 A1* | 5/2004 | Prentkowski | B60R 22/1952 |
| | | | 280/806 |
| 2004/0232670 A1* | 11/2004 | Devereaux | B60R 22/18 |
| | | | 280/735 |
| 2004/0256850 A1* | 12/2004 | Yamaguchi | B60R 22/195 |
| | | | 280/806 |
| 2006/0220369 A1* | 10/2006 | Gray | B60R 22/1955 |
| | | | 280/806 |
| 2011/0068614 A1* | 3/2011 | Sugiyama | B60R 22/1952 |
| | | | 297/480 |
| 2011/0221178 A1* | 9/2011 | Lane, Jr. | B60R 22/1952 |
| | | | 280/806 |
| 2011/0316265 A1* | 12/2011 | Lane, Jr. | B60R 22/1955 |
| | | | 280/806 |

* cited by examiner

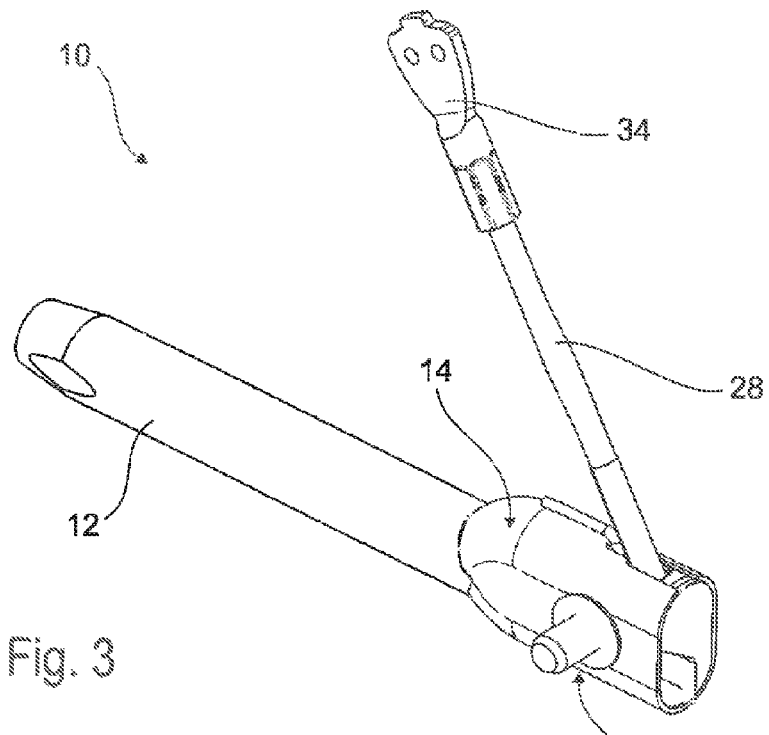
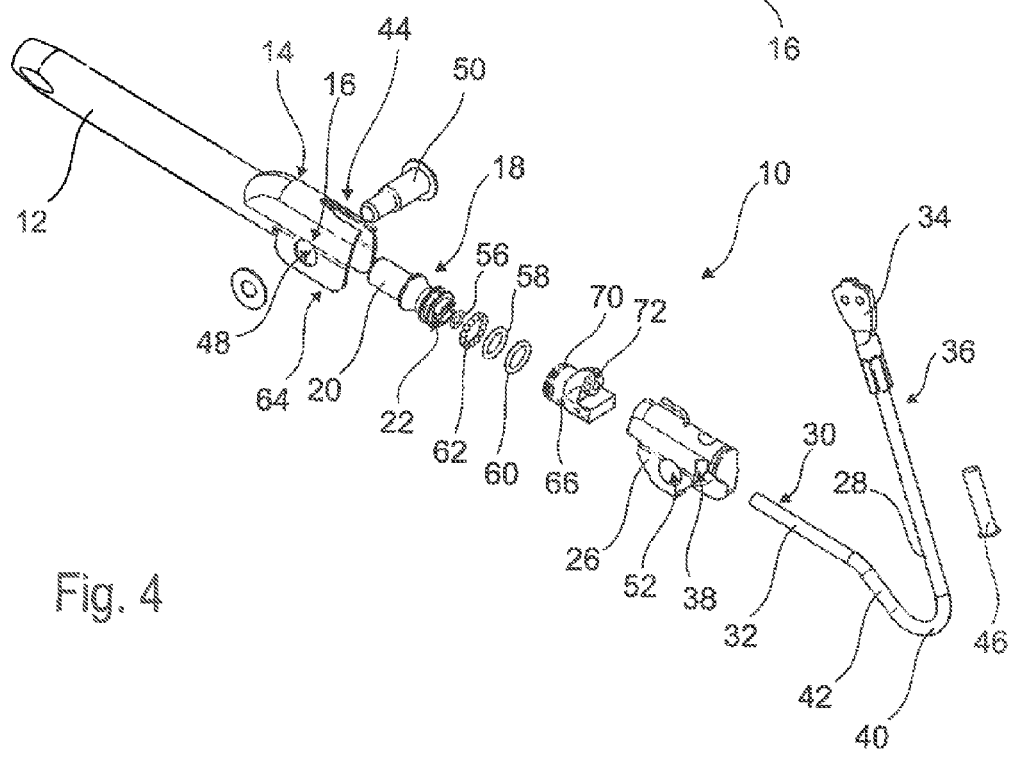

TENSIONER FOR A VEHICLE SAFETY DEVICE

This application corresponds to PCT/EP2015/000294, filed Feb. 11, 2015, which claims the benefit of German Application No. 10 2014 002 006.1, filed Feb. 17, 2014, the subject matter, of which are incorporated herein by reference in their entirety.

BACKGROUND OF THE INVENTION

The invention relates to a tensioner for a vehicle safety device, especially a belt buckle tensioner or an end fitting tensioner.

Tensioners are used in versatile manners in vehicle safety devices. As a rule, they comprise a tubular casing in which a piston is movably supported, wherein an inflator is provided which in the case of release acts on the piston so that the piston is displaced in the tubular casing so that the tensioning cable is tensioned. Tensioning of the tensioning cable displacement of a belt buckle or end fitting arranged on the other end of the tensioning cable and tensioning of the seat belt. Moreover, the tensioners known from the state of the art include deflecting elements for the tensioning cable within the tensioner and the tubular casing, respectively. The tubular casing is further tightly dosed, with the exception of an aperture for passing through the tensioning cable, by a closing member in the form of a plug. Moreover, the tensioner or the tubular casing has to be adapted to be fastened on the vehicle side. For this purpose, typically a separate fastening portion in the form of a clamping piece by which the tensioner is fastened on the vehicle side is mounted on the tubular casing. In total, the tensioners known from the state of the art thus consist of plural individual components which, on the one hand, have to be assembled and, on the other hand, have to be carefully seated at the numerous contact points. This is connected with considerable mounting and cost expenditure. Further, such tensioners require increased space due to their numerous components.

SUMMARY OF THE INVENTION

It is therefore the object of the invention to provide a tensioner which has reduced mounting effort while the quality is constantly high.

In accordance with the invention, the object is achieved by a tensioner for a vehicle safety device comprising a tubular casing in which a piston is movably supported, a closure member closing the tubular casing on the front face which forms a cable guide for a tensioning cable that may be connected to a belt buckle or an end fitting and in which cable guide the tensioning cable is deflected in arc shape, an inflator accommodated in the closure member, wherein the tubular casing has a receiving portion for receiving the closure member as well as a fastening portion serving for fastening the tensioner to a vehicle frame. The basic idea of the Invention provides to facilitate assembly of the tensioner in that the tubular casing includes both a receiving area for the closure member and a fastening portion via which the tensioner can be fastened to the vehicle frame. In accordance with the invention, the tubular casing of the tensioner hence simultaneously fulfills plural functions, thus providing a compact tensioner that is easy to assemble. Furthermore, the closure member itself includes the cable guide for the tensioning cable defecting the tensioning cable in an arc shape, which causes the tensioning cable to be appropriately guided with low friction and separate components for cable guiding to be saved, which in turn reduces the mounting effort.

In particular, the fastening portion is located in the receiving area. This allows achieving optimum support of the tensioner, as the fastening portion is arranged in the area of the tubular casing in which the largest mass is received.

According to an aspect of the invention it is provided that the closure member and the tubular casing in the area of the fastening portion Include a recess through which a fastening means projects for fastening the tensioner on the vehicle side. The tubular casing thus may be fastened directly on the vehicle, wherein the closure member equally includes a recess via which the closure member can be mounted on the tubular casing.

Especially the recesses of the fastening portion and of the closure member are aligned with each other. The fastening means which fastens the tubular casing to the vehicle may simultaneously fix the closure member on the fastening portion, thus the mounting effort also being further reduced, as only one fastening means is required.

According to another aspect of the invention, the closure member is provided to be formed in one piece. The closure member that guides the tensioning cable and receives the inflator thus is in the form of an integral subassembly, wherein the closure member at the same time tightly closes the tubular casing on one axial end. The closure member thus fulfills at least three functions. By the integral design the mounting expenditure and, respectively, the mounting effort in turn can be reduced.

Another aspect of the invention provides a pressure chamber which is partly delimited by the tubular casing to be formed between the closure member and the piston. Since the tubular casing constitutes part of the pressure chamber wall, it is especially easy to manufacture. A separate pressure chamber casing need not be introduced into the tensioner and be fastened. The pressure built up in the pressure chamber acts on the piston so as to displace the same inside the tubular casing.

In particular, the tubular casing includes a lateral opening for the tensioning cable, wherein the tensioning cable is continuously guided in the tubular casing up to the opening or the tensioning cable in portions sticks out of the tubular casing on the side opposed to the opening. The guideway ensures that the tensioning cable extends in the area of the piston coaxially thereto so that there is no angular offset which might have a negative effect during later tensioning. The fact that the tensioning cable in portions sticks out of the tubular casing allows for a larger bending radius of the tensioning cable inside the cable guide, thus causing appropriate running properties of the tensioning cable along the cable guide to be achieved.

According to another aspect of the invention it is provided that a cable inlet member mounted on the closure member through which the tensioning cable is passed and in which the tensioning cable is deflected is provided between the closure member and the piston. The cable Inlet member ensures that inside the tensioner the tensioning cable is guided to the piston so that no excessively small bending radii occur which might negatively affect the tensioning behavior of the tensioning cable.

Especially the closure member and the cable inlet member can be attached to each other. The modular structure helps to achieve that different cable inlet members can be combined with different closure members, thus allowing different combinations to be formed for different types of tensioners or tensioning cables, respectively.

According to another aspect of the invention, a pressure chamber connected to the inflator is provided in the closure member. The gas generated by the inflator is transmitted via the pressure chamber to the piston which is appropriately displaced within the tubular casing. The closure member thus also adopts the function of a gas or pressure line.

The closure member in particular includes a peripheral annular groove including a sealing arranged thereon which contacts the inner side of the tubular casing. The sealing can be formed on the closure member itself or on the cable inlet member. This ensures that the pressure chamber is sealed toward the open axial end of the tubular casing and that the closure member tightly seals the tubular casing on the front end.

Another aspect of the invention provides that the closure member is a plastic injection-molded part, especially a multi-component injection-molded part. In this way, an especially inexpensive closure member possibly including an injection-molded seal can be manufactured, wherein based on the injection-molding technique complicated geometries can be realized so that even micro-tensioners including micro-inflators can be easily incorporated.

BRIEF DESCRIPTION OF THE DRAWING

Further advantages and aspects of the invention are resulting from the following description and the drawings that are referred to. The drawings illustrate in.

DESCRIPTION

Figure 1:
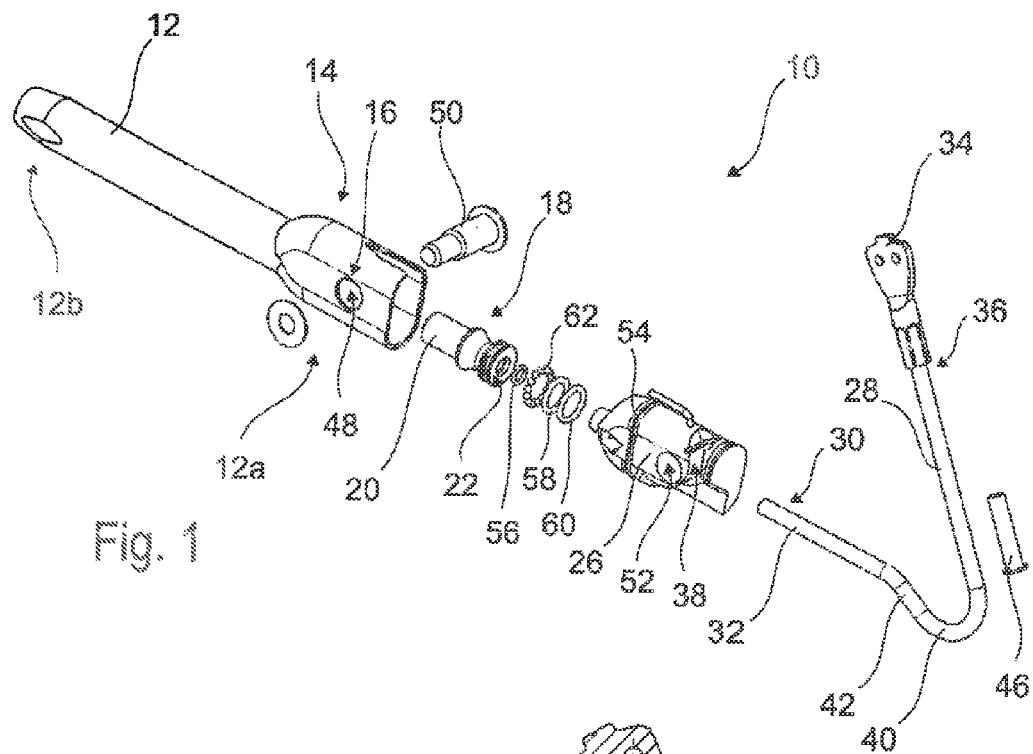
FIG. 1 a perspective exploded view of a tensioner according to the invention in accordance with a first embodiment, FIG. 2 a sectional view across the assembled tensioner according to FIG. 1, FIG. 3 a perspective view of the assembled tensioner of FIGS. 1 and 2, FIG. 4 a perspective exploded view of a tensioner according to the invention in accordance with a second embodiment, FIG. 5 a sectional view across the tensioner of FIG. 4 in the assembled state, and FIG. 6 a perspective view of the tensioner according to FIGS. 4 and 5 in the assembled state.
Figure 2:
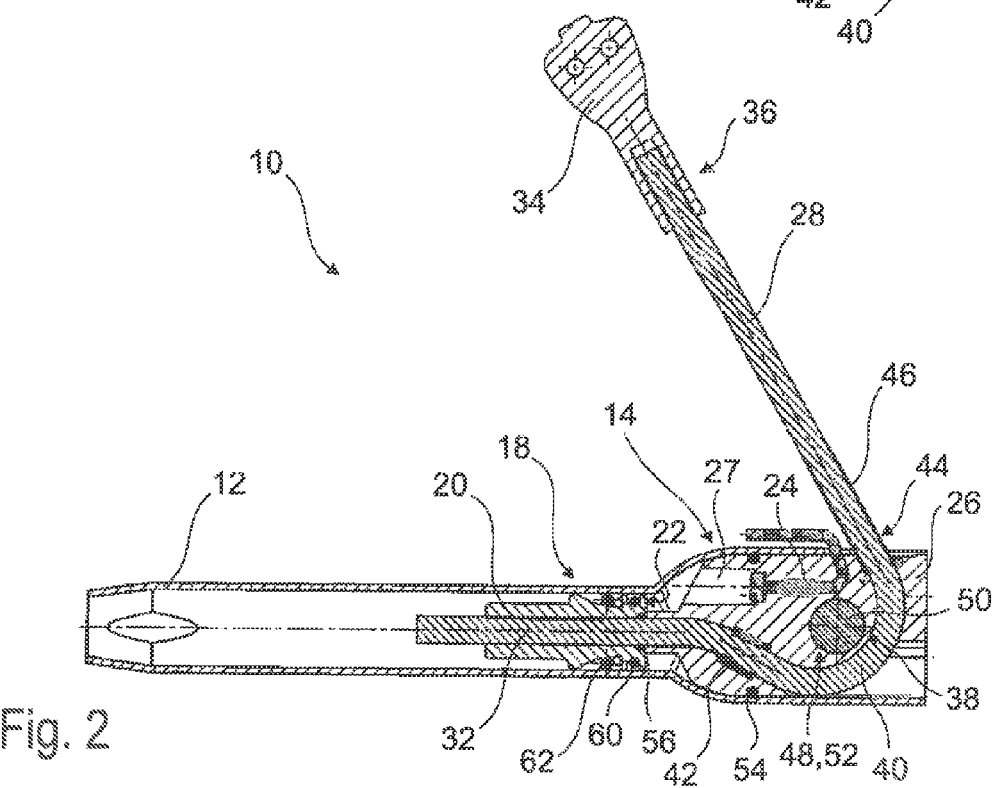

In FIGS. 1 to 3 a tensioner 10 according to a first embodiment in the form of a buckle or end fitting tensioner is illustrated.

The tensioner 10 comprises a tubular casing 12 including a receiving area 14 on an axial front end 12*a*. The tubular casing 12 moreover includes a fastening portion 16 provided in the receiving area 14.

In the tubular casing 12 furthermore a piston 18 is movably supported, wherein the piston 18 includes a bushing portion 20 and an actuating portion 22 which are formed in one piece. The piston 18 interacts with an inflator 24 provided inside a closure member 28 (cf. FIG. 2) which is put into the receiving area 14 of the tubular casing 12. The closure member 28 in the assembled state closes the tubular casing 12 on its front end 12*a*.

After being ignited, the inflator 24 acts on the actuating portion 22 of the piston 18 via a pressure chamber 27 partly present in the closure member 26 (cf. FIG. 2) so as to axially displace the piston 18 inside the tubular casing 12. Thus the piston 18 is displaced or urged, respectively, toward the end 12*b* of the tubular casing 12 opposed to the front end 12*a*.

The pressure chamber 27 is configured so that the tubular casing 12 is part of the chamber wall.

The piston 18 moreover is connected to a tensioning cable 28 via its bushing portion 20 so that displacement of the piston 18 within the tubular casing 12 results in tensioning of the tensioning cable 28. For this purpose, the piston 18 is coupled, more exactly clamped, to a damping portion 32 of the tensioning cable 28 arranged on a first end 30 of the tensioning cable 28.

When the tensioning cable 28 is tensioned via its clamping portion 32 by the piston 18 and the inflator 24, resp., such tensioning is transmitted to a fitting 34 arranged on the other end 38 of the tensioning cable 28. In this way, a belt buckle or an end fitting, for example, is tensioned so that a vehicle occupant is restrained.

The tensioning cable 28 extends partly inside the tubular casing 12, wherein the tensioning cable 23 is deflected by the closure member 26. For this purpose, the closure member 26 includes a cable guide 38 in the form of a groove-type recess extending in the form of a pitch circle so that the tensioning cable 28 with a deflecting portion 40 may lay around the cable guide 38 and is guided along the latter (cf. FIG. 2). Due to this configuration of the cable guide 38, low-frictional running of the tensioning cable 28 along the cable guide 38 is guaranteed.

In the area of the cable guide 38 the tensioning cable 28 moreover includes a guide sleeve 42 (cf. FIG. 2) which serves for guiding the tensioning cable 28 with low friction to the piston 18 in the area of the cable guide 38 and behind the deflection portion 40 of the tensioning cable 28.

In the shown embodiment, starting from its clamping portion 32 at the first end 30 the tensioning cable 28 extends continuously inside the tubular casing 12 until it leaves the tubular casing 12 laterally at an opening 44. At the opening 44 again a guide sleeve 46 is arranged which serves for supporting the tensioning cable 28 even outside the tubular casing 12 so as to prevent the tensioning cable 28 from bending shortly behind the opening 44.

As already mentioned in the beginning, the tubular casing 12 includes, next to the receiving area 14, the fastening portion 16 by which the tubular casing 12 is fastened on the vehicle side.

In the shown embodiment, the fastening portion 16 is formed by a continuous recess 48 interacting with a fastening means 50 (in this case a stud bolt) so that the tubular casing 12 can be fastened to a vehicle frame via its fastening portion 16.

The closure member 26 equally comprises a recess 52 which in the assembled state is aligned with the recess 48 of the fastening portion 16 (cf. FIG. 2) so that the fastening means 50 projects both through the recess 48 of the fastening portion 16 and through the recess 46 inside the closure member 26.

Hence, via the one fastening means 50 the closure member 26 can be fastened to the tubular casing 12 and to the receiving area 14, resp., and at the same time the casing tube 12 can be fastened to a vehicle.

The closure member 26 moreover includes a groove having a sealing 64 arranged thereon so as to tightly close the open axial end 12*a* of the tubular casing 12. The sealing 54 arranged in this way is located between the closure member 26 and the inner wall of the tubular casing 12 (cf. FIG. 2).

Moreover, further sealing rings 56, 58, 60 are provided for sealing the tubular casing 12 and, respectively, the individual areas. The sealing ring 56 seals, for example, the inlet area of the tensioning cable 28 into the piston 18, whereas the sealing rings 58, 60 are associated with the piston 18 and the tubular casing 12.

Furthermore, balls 62 running on a conical surface of the piston 18 and indenting into the tubular casing 12 after tensioning are provided so that the piston 18 cannot be withdrawn anymore inside the tubular casing 12.

FIG. 3 illustrates the assembled tensioner 10 according to the first embodiment in the assembled state.

Figure 5:
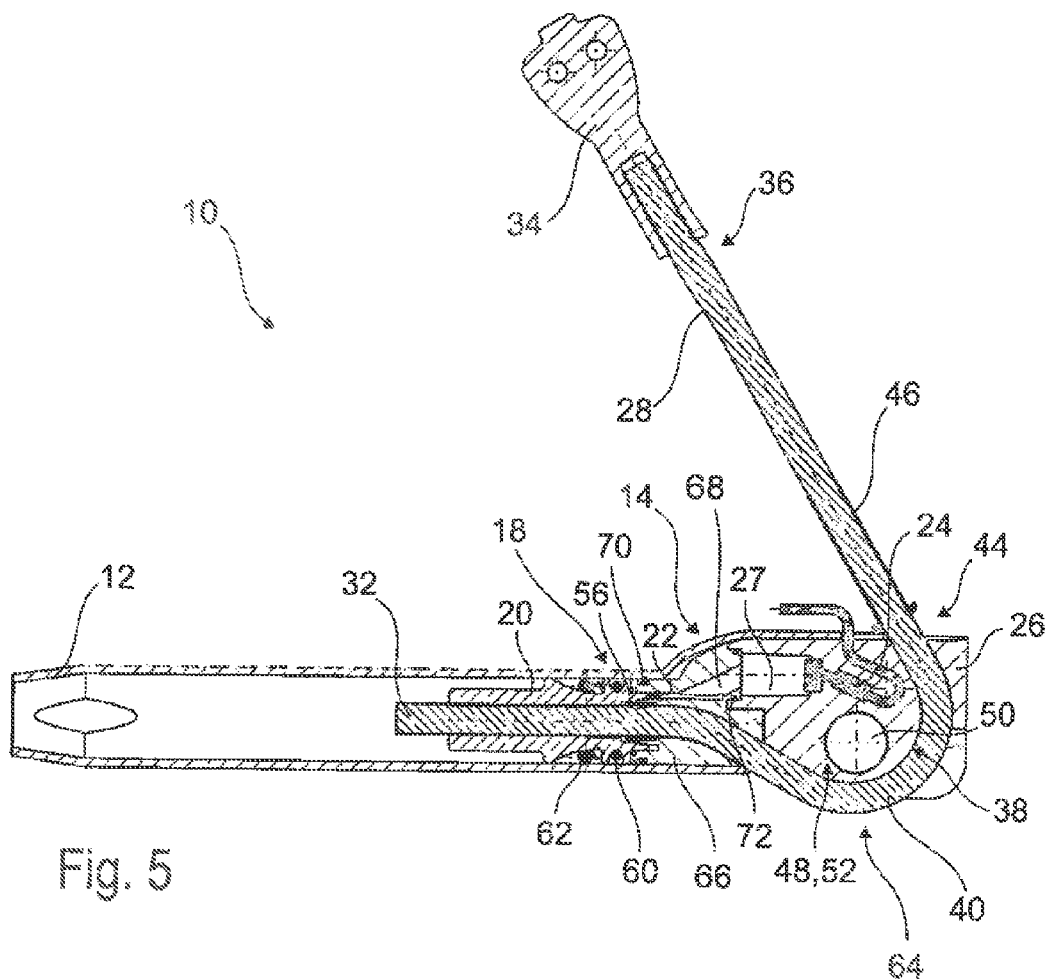
Figure 6:
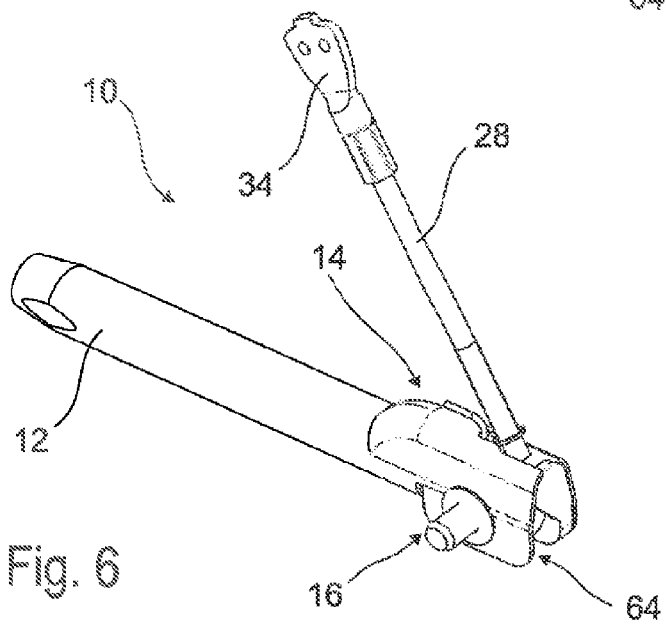

In FIGS. 4 to 6 a tensioner 10 according to a second embodiment is illustrated. The differences between the second embodiment and the first embodiment will be explained hereinafter, wherein equal or equally functioning components are provided with equal reference numerals.

The tensioner 10 according to the second embodiment differs from the tensioner 10 of the first embodiment to the effect that the tubular casing 12 includes a recess 64 facing the opening 44 of the tubular casing 12.

Thanks to the recess 64 the tensioning cable 28 may stick out of the tubular casing 12 in portions in the area of the deflecting portion 40 and of the cable guide 38 of the closure member 26, respectively (FIG. 5). In this way it is achieved that the tensioning cable 28 may cover a larger bending radius in its deflecting portion 40 than in the first embodiment, thus allowing the tensioning cable 28 to be guided more easily inside the tubular casing 12 and the tensioner 10, respectively.

In addition, the closure member 28 in the second embodiment is structured so that it interacts with a cable inlet member 66 which can be attached to the closure member 28.

The cable inlet member 66 ensures that the tensioning cable 28 is deflected behind the cable guide 38 so that it extends in parallel to the axial orientation of the tubular casing 12 into the piston 18 and the bushing portion 20 of the piston 18, respectively. This helps to prevent shear forces that might impair the functioning of the tensioner 10. The tensioning cable 28 thus is arranged in the area of the piston 13 coaxially to the latter and to the tubular casing 12.

The cable inlet member 66 inter alia replaces the guide sleeve 42 from the first embodiment.

The cable inlet member 66 further includes a pressure guiding duct 68 which, starting from the pressure chamber 27, leads to the actuating portion 22 of the piston 18 so that the pressure generated by the inflator 24 acts on the actuating portion 22 of the piston 18.

Furthermore, the cable inlet member 66 includes two sealing rings 70, 72 which interact with the closure member 26 and the piston 18 so that, on the one hand, the transition area between the pressure chamber 27 and the pressure guiding duct 68 and, on the other hand, the transition area between the cable inlet member 66 and the tubular casing 12 are sealed.

In FIG. 6 the tensioner 10 according to the second embodiment is illustrated in the assembled state.

In total, the parts required for assembling a tensioner 10 were minimized so that the entire tensioner 10 can be assembled with as little mounting expenditure as possible, with the tensioner 10 moreover exhibiting a compactor design.

In all embodiments the tensioning cable 28 is continuously guided inside the tubular casing up to the opening 44 in the non-actuated home position.

The closure member 28 especially is a plastic injection-molded part, in particular a multi-component injection-molded part. The sealing 54 and/or the guiding sleeve 42 may be attached by injection-molding.

The invention claimed is:

1. A tensioner (10) for a vehicle safety device, comprising:

a tubular casing (12) in which a piston (18) is movably supported, the tubular casing having a fastening portion (16) serving for fastening the tensioner (10) to a vehicle frame;

a closure member (26) closing the tubular casing (12) on the front face which forms a cable guide (38) for a tensioning cable (28) adapted to be connected to a belt buckle or an end fitting (34) and in which cable guide the tensioning cable (28) is deflected in arc shape; and an inflator (24) accommodated in the closure member (26);

wherein the tubular casing (12) includes a receiving portion (14) for receiving and at least partially housing the closure member (26) therein;

and wherein the closure member (26) is configured in one piece.

2. The tensioner (10) according to claim 1, wherein the fastening portion (16) is located in the receiving area (14).

3. The tensioner (10) according to claim 1, wherein in the area of the fastening portion (16) the closure member (26) and the tubular casing (12) include a recess (48, 52) through which a fastening means (50) projects for fastening the tensioner (10) on the vehicle side.

4. The tensioner (10) according to claim 3, wherein the recesses (48, 52) of the fastening portion (16) and the closure member (26) are aligned with each other.

5. The tensioner (10) according to claim 1, wherein a pressure chamber (27) that is partly delimited by the tubular casing (12) is formed between the closure member (26) and the piston (18).

6. The tensioner (10) according to claim 1, wherein the tubular casing (12) includes a lateral opening (44) for the tensioning cable (28), and wherein the tensioning cable (28) is continuously guided inside the tubular casing (12) up to the lateral opening (44) or the tensioning cable (28) sticks out of the tubular casing (12) in portions on the side facing the lateral opening (44).

7. The tensioner (10) according to claim 1, wherein a cable inlet member (66) mounted on the closure member (26) through which the tensioning cable (28) is guided and in which the tensioning cable (28) is deflected is provided between the closure member (26) and the piston (18).

8. The tensioner (10) according to claim 7, wherein the closure member (26) and the cable inlet member (66) can be attached to each other.

9. The tensioner (10) according to claim 1, wherein in the closure member (26) a pressure chamber (27) connected to the inflator (24) is provided.

10. The tensioner (10) according to claim 1, wherein the closure member (26) includes a peripheral annular groove having a sealing (54) arranged thereon which contacts the inner side of the tubular casing (12).

11. The tensioner (10) according to claim 1, wherein the closure member (26) is a plastic injection-molded part, especially a multi-component injection-molded part.

12. A tensioner (10) for a vehicle safety device, comprising:

a tubular casing (12) in which a piston (18) is movably supported, the tubular casing (12) including a receiving portion (14) for receiving a closure member (26) and a fastening portion (16) serving for fastening the tensioner (10) to a vehicle frame, the closure member (26) closing the tubular casing (12) on the front face which forms a cable guide (38) for a tensioning cable (28) adapted to be connected to a belt buckle or an end fitting (34) and in which cable guide the tensioning cable (28) is deflected in arc shape, the closure member (26) being configured in one piece; and an inflator (24) accommodated in the closure member (26);

wherein in the area of the fastening portion (16), the closure member (26) and the tubular casing (12) include a recess (48, 52) through which a fastening means (50) projects for fastening the tensioner (10) on the vehicle side.

13. The tensioner (10) according to claim 12, wherein the fastening portion (16) is located in the receiving area (14).

14. The tensioner (10) according to claim 12, wherein the recesses (48, 52) of the fastening portion (16) and the closure member (26) are aligned with each other.

15. The tensioner (10) according to claim 12, wherein a pressure chamber (27) that is partly delimited by the tubular casing (12) is formed between the closure member (26) and the piston (18).

16. The tensioner (10) according to claim 12, wherein the tubular casing (12) includes a lateral opening (44) for the tensioning cable (28), and wherein the tensioning cable (28) is continuously guided inside the tubular casing (12) up to the lateral opening (44) or the tensioning cable (28) sticks out of the tubular casing (12) in portions on the side facing the lateral opening (44).

17. A tensioner (10) for a vehicle safety device, comprising:

a tubular casing (12) in which a piston (18) is movably supported, the tubular casing (12) having a lateral opening (44) for a tensioning cable (28), the tensioning cable (28) being continuously guided inside the tubular casing (12) up to the lateral opening (44) or the tensioning cable (28) sticking out of the tubular casing (12) in portions on the side facing the lateral opening (44);

a closure member (26) closing the tubular casing (12) on the front face which forms a cable guide (38) for the tensioning cable (28) adapted to be connected to a belt buckle or an end fitting (34) and in which cable guide the tensioning cable (28) is deflected in arc shape, the closure member (26) being configured in one piece; and an inflator (24) accommodated in the closure member (26);

wherein the tubular casing (12) includes a receiving portion (14) for receiving the closure member (26) and a fastening portion (16) serving for fastening the tensioner (10) to a vehicle frame.

18. The tensioner (10) according to claim 17, wherein the fastening portion (16) is located in the receiving area (14).

19. The tensioner (10) according to claim 17, wherein in the area of the fastening portion (16), the closure member (26) and the tubular casing (12) include a recess (48, 52) through which a fastening means (50) projects for fastening the tensioner (10) on the vehicle side.

20. The tensioner (10) according to claim 17, wherein a pressure chamber (27) that is partly delimited by the tubular casing (12) is formed between the closure member (26) and the piston (18).

* * * * *